(12) United States Patent
Leroy

(10) Patent No.: US 7,982,737 B2
(45) Date of Patent: Jul. 19, 2011

(54) SYSTEM AND METHOD FOR INDEPENDENT FONT SUBSTITUTION OF STRING CHARACTERS

(75) Inventor: Luc H. Leroy, Los Gatos, CA (US)

(73) Assignee: Adobe System Incorporated, San Jose, CA (US)

( * ) Notice: Subject to any disclaimer, the term of this patent is extended or adjusted under 35 U.S.C. 154(b) by 884 days.

(21) Appl. No.: 11/931,550

(22) Filed: Oct. 31, 2007

(65) Prior Publication Data

US 2009/0109227 A1    Apr. 30, 2009

(51) Int. Cl.
*G06T 11/00* (2006.01)
(52) U.S. Cl. ........................................ 345/467; 345/471
(58) Field of Classification Search .................. 345/467, 345/471
See application file for complete search history.

(56) References Cited

U.S. PATENT DOCUMENTS

| | | | |
|---|---|---|---|
| 5,167,013 A | 11/1992 | Hube et al. | |
| 5,185,818 A | 2/1993 | Warnock | |
| 5,398,306 A | 3/1995 | Karow | |
| 5,495,577 A * | 2/1996 | Davis et al. | 715/238 |
| 5,500,931 A * | 3/1996 | Sonnenschein | 715/234 |
| 5,577,170 A | 11/1996 | Karow | |
| 5,664,086 A * | 9/1997 | Brock et al. | 345/468 |
| 5,859,648 A | 1/1999 | Moore et al. | |
| 6,552,728 B1 | 4/2003 | Moore et al. | |
| 6,952,210 B1 | 10/2005 | Renner et al. | |
| 7,692,656 B2 * | 4/2010 | Opstad et al. | 345/467 |
| 7,773,089 B2 * | 8/2010 | Nakamura et al. | 345/467 |
| 2002/0130871 A1 * | 9/2002 | Hill et al. | 345/467 |
| 2005/0275656 A1 * | 12/2005 | Corbin et al. | 345/467 |
| 2006/0017733 A1 * | 1/2006 | Matskewich et al. | 345/467 |
| 2006/0232588 A1 * | 10/2006 | Opstad et al. | 345/467 |
| 2008/0303822 A1 * | 12/2008 | Taylor et al. | 345/467 |

OTHER PUBLICATIONS

Jason Teague, DHTML and CSS for the World Wide Web, pp. 67-69 and 443.*

\* cited by examiner

*Primary Examiner* — M Good Johnson
(74) *Attorney, Agent, or Firm* — Robert C. Kowert; Meyertons, Hood, Kivlin, Kowert & Goetzel, P.C.

(57) ABSTRACT

Various embodiments of a system and method for independent font substitution of string characters are described. The system and method for independent font substitution may include a font substitution component configured to receive a descriptor item that may include a text string that includes multiple characters, metrics associated with characters of the text string, and/or a preferred font for one or more of the characters. For a particular character, if the preferred font is available, the font substitution component may use a glyph from the preferred font to render a particular character. In other cases, if a font of the set of safe fonts includes a glyph that matches the particular character, the font substitution component may use that glyph to resolve the particular character. The font substitution component may generate a resolved text string includes such glyphs and scale the size of the glyphs according to the aforementioned metrics.

25 Claims, 7 Drawing Sheets

SYSTEM AND METHOD FOR INDEPENDENT FONT SUBSTITUTION OF STRING CHARACTERS

BACKGROUND

1. Field of the Invention

The present invention is directed to font substitution. More particularly, it is directed to substituting fonts of string characters within computing environments.

2. Description of the Related Art

In modern computing, the transfer of documents or files between computer systems is a common occurrence. For instance, electronic mail messages ("emails") as well as email attachments (e.g., additional files or documents) are transferred between various users of the Internet and World Wide Web. In another example, documents and/or files are transferred between computer systems via a local area network (LAN) or via physical memory medium (e.g., compact disc or flash memory). In many cases, documents transferred between computer systems contain text or text-based information. To facilitate the rendering and display of text, formatting information is typically provided within documents that contain textual information. One type of formatting information includes fonts. Fonts may include a set of glyphs, each of which may represent the shape of various characters (e.g., graphemes, numerals, symbols, and/or punctuation marks). Fonts may have different styles, which may be reflected in the shape of each font's constituent glyphs. The style of a particular glyph is typically similar to the style of another glyph of the same font.

Typically, computer systems have multiple installed fonts. In some cases, such fonts are installed automatically during the installation of an operating system. In other cases, fonts are installed with particular software applications, such as word processing applications, desktop publishing applications, and other applications configured to display or format text. In yet other cases, fonts may be individually installed by a user or system administrator. Whether a particular computer system can display textual information according to a particular font may depend on whether such font is installed on the particular computer system. In some cases, a set of fonts installed on one computer system may be different than a set of fonts installed on another computer system. Accordingly, while one computer system may be able to correctly display text according to a particular font, another computer system that has a different set of installed fonts may not be able to correctly display the text according to the particular font.

SUMMARY

Various embodiments of a system and method for independent font substitution of string characters are described. The system and method for independent font substitution may include a font substitution component configured to receive a descriptor item that may in some embodiments include a text string that includes multiple characters, metrics associated with the text string and/or individual characters of the text string, and/or a preferred font for one or more of the characters. For each character of the text string, the font substitution component may be configured to determine whether the particular character's preferred font is available (e.g., determine whether the font is installed on the local computer system). If the font is available, the font substitution component may use a glyph from the preferred font to render a particular character. In other cases, such as when a character's preferred font is not available, the font substitution component may be configured to determine whether a font of a set of safe fonts includes a glyph for resolving the particular character. In some embodiments, the safe fonts may collectively span a universal character set that includes all (or most) of the characters that may be identified within various descriptor items. If the font substitution component determines that a font of the set of safe fonts includes a glyph that matches the particular character, the font substitution component may use that glyph to resolve the particular character. The font substitution component may be configured to generate a resolved text string that includes each of the glyphs selected to resolve the characters of the text string. In various embodiments, the resolved text string as a whole and/or individual glyphs of the resolved text string may be scaled (e.g., scaled with respect to size) according to the metrics indicated by the descriptor item.

While the system and method for independent font substitution of string characters is described herein by way of example for several embodiments and illustrative drawings, those skilled in the art will recognize that the system and method for independent font substitution of string characters is not limited to the embodiments or drawings described. It should be understood, that the drawings and detailed description thereto are not intended to limit embodiments to the particular form disclosed. The intention is to cover all modifications, equivalents and alternatives falling within the spirit and scope of the system and method for independent font substitution of string characters as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a system and method for independent font substitution of string characters are described. The system and method for independent font substitution may include a font substitution component that may be configured to generate a graphical representation of text strings, such as a graphical representation displayed on a computer display (e.g., a monitor) or a hard copy graphical representation (e.g., a printed document). For a text string of a particular font, the font substitution component may be configured to generate a graphical representation of the text string using one or more fonts that other than the particular font. In some embodiments, the font substitution component may generate a graphical representation of a text string such that multiple characters of the text string are each rendered according to a different font. In some embodiments, the font substitution component may generate a graphical representation of a text string such that each character of the text string is scaled according to metrics specific to the respective character. In other cases, the font substitution component may be configured to generate a representation of the text string that is scaled according to metrics of the entire string. In some embodiments, font substitution performed on one character may be performed independently of font substitution on another character of the same text string. Such font substitution may be referred to herein as character-by-character font substitution.

Figure 1:
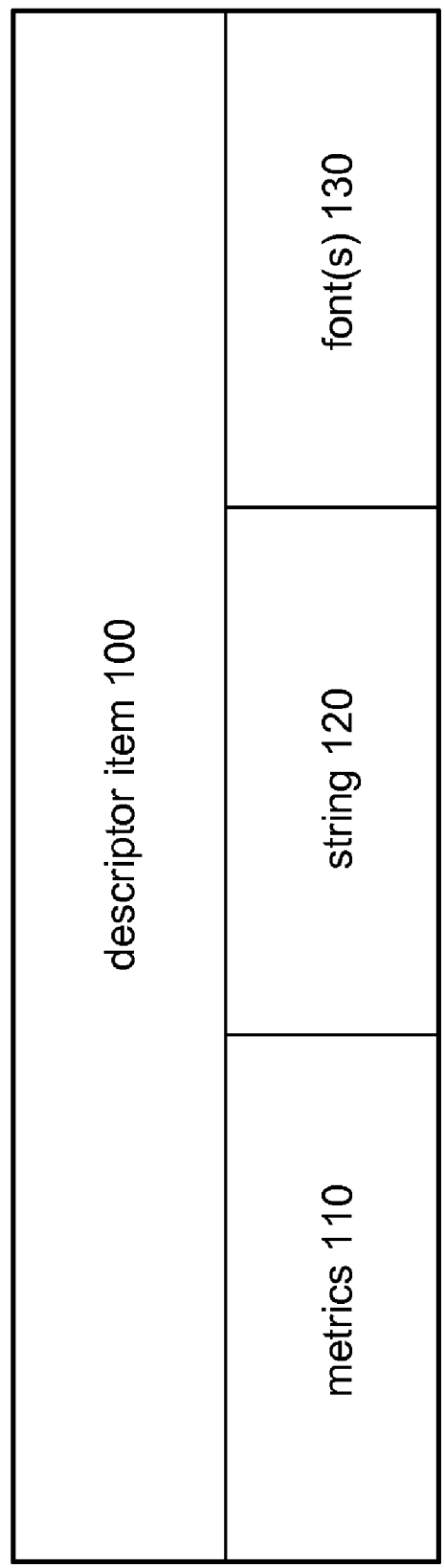
FIG. 1 is a block diagram illustrating one example of a descriptor item, according to one embodiment.

The font substitution component may in various embodiments be configured to generate graphical representations of text strings from one or more descriptor items, such as descriptor item 100 illustrated by FIG. 1. Descriptor item 100 may in some cases be a data object that includes information for rendering a particular text string. As illustrated by metrics 110, the descriptor item may include metrics that indicate information for rendering the particular text string. Metrics 110 may indicate the dimensions of a bounding box for the particular text string. A bounding box may define the maximum dimensions of text string. For instance, in a two dimensional environment, a bounding box may specify the maximum width and maximum height of a rectangle that completely includes the particular text string. For example, dimensions of a bounding box may be 100 pixels in height and 500 pixels in width (other units, such as metric units may also be used to indicate such height and width). In a three dimensional environment, a third dimension (e.g., depth) may also be employed. Such metrics may also include information that indicates the position of a bounding box, such as coordinates of one or more of the bounding box's corners (e.g., x-y coordinates within a two dimensional document, x-y-z coordinates within a three dimensional document, or some other coordinates of another coordinate system). One skilled in the art will be familiar with other information for indicating the position of a bounding box within a two dimensional or three dimensional environment; it is the intention of various embodiments to include such position-related information. In various embodiments, metrics 100 may include dimensions for separate bounding boxes for each character of the text string. In some cases, such metrics may be different for each character. For example, for a particular font, the dimensions of a bounding box of a lower case "x" would be smaller than the dimensions of a bounding box of an upper case "M." Examples of bounding boxes according to some embodiments are described below in regard to FIG. 4. In some embodiments, metrics 110 may include information other than bounding box and position-related information. For instance, in some cases, metrics 110 may specify stroke width for the entire string and/or specific characters of the particular text string.

As illustrated by string 120, descriptor item 100 may include information or data that indicates the particular text string to be rendered. Such text string may include any series of characters, graphemes, numerals, symbols, and/or punctuation marks. For instance, an example of a text string might include "Example." In general, string 120 may indicate any string of characters. The descriptor item may also indicate a preferred font, such as preferred fonts 130, with which to render string 120. In some cases, preferred fonts 130 may indicate a separate font for each character of text string 120. For instance, the preferred font of one character of the text string may be a Latin font whereas the preferred font of another character of the text string may be a Japanese font.

Figure 2:
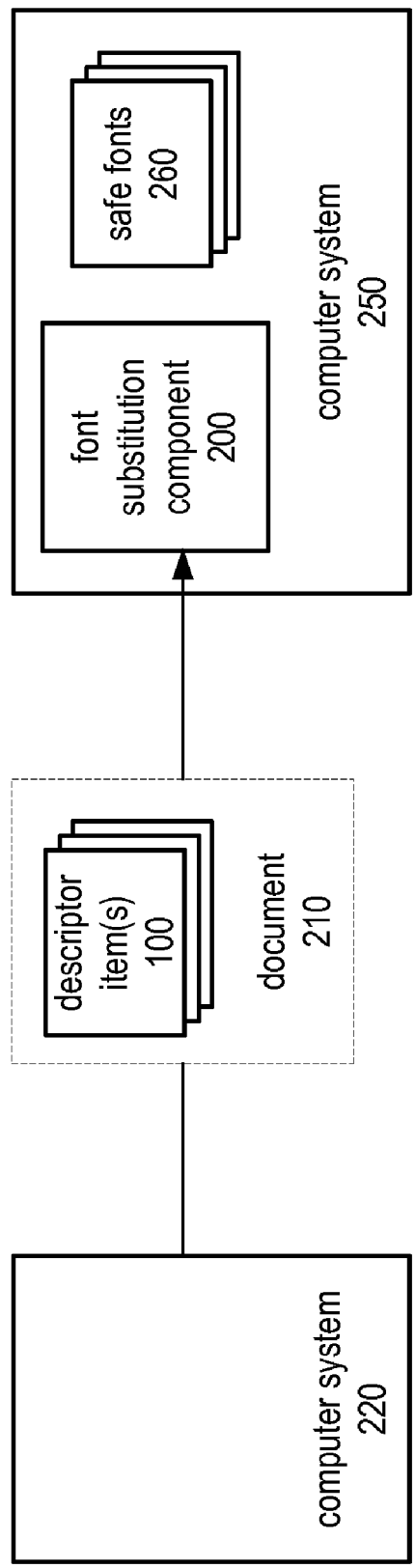
FIG. 2 is a data flow diagram illustrating the transfer of documents to a computer system including a font substitution component, according to one embodiment.

In various embodiments, one or more descriptor items, such as descriptor item 100, may be included within documents transferred between computer systems. As illustrated in FIG. 2, a plurality of descriptor items included within a document, such as document 210 may be transferred from one computer system, such as computer system 220, to another computer system, such as computer system 250. The transfer of document 210 may be performed in a variety of ways including, but not limited to, transferring the document over a network, such as a local area network (LAN), wide area network (WAN) (e.g., the Internet), or some combination thereof. In one case, document 210 may be an email attachment transferred via electronic mail. In some embodiments, the transfer of document 210 may occur through a physical medium, such as a compact disk or flash memory device. One skilled in the art will recognize various techniques for transferring a document or file between computer systems; it is the intention of various embodiments to include such techniques.

In the illustrated embodiment, font substitution component 200 may receive descriptor items 100 and generate a graphical representation of each of the descriptor items' text strings. For instance, to generate a graphical representation of a descriptor item's text string, font substitution component 200 may generate a display that graphically indicates the respective text strings. While the illustrated embodiment indicates that the font substitution component receives document 210 and descriptor items 100 from computer system 220, the font substitution component may in some embodiments access document 210 and/or descriptor items 100 from another location. For instance, document 210 and/or descriptor items 100 may be stored on another computer system or may be stored locally on computer system 250.

Font substitution component 200 may be configured to determine the metrics, text string(s), and font indicated by a descriptor item and generate a respective graphical representation of the text string. Font substitution component may also be configured to determine which fonts are installed on computer system 250. Accordingly, font substitution component may determine which fonts are available to render the text strings indicated by descriptor items 100. For a particular descriptor item, if the preferred font (e.g., as indicated by font 130) is available, the font substitution component may generate a graphical representation of the text string according to the preferred font. In other words, in the graphical representation, the characters of the text string may be resolved with the glyphs of the preferred font. As described above, each character of a text string (e.g., text string 120) may have a respective font (e.g., fonts 130 may indicate a separate font for each character of string 120). In this case, the font substitution component may, for each character having a preferred font that is available on computer system 250, resolve the respective character with a glyph from the respective preferred font.

In some cases, the preferred font for a character may not be installed on computer system 250 (or the font may be unavailable for some other reason, such as a corrupt font file). In this case, font substitution component 200 may perform one or more font substitution techniques in order to generate a graphical representation of the text strings indicated by the descriptor items. In some embodiments, font substitution component 200 may determine a set of multiple fonts to use for font substitution. This set of multiple fonts may be referred to herein as the "safe fonts," as illustrated by safe fonts 260. In some embodiments, the union of each safe font may collectively span a universal character set. This universal character set may in some embodiments include the glyphs necessary to resolve each character of each text string of each descriptor item 100. However, in some embodiments, the universal character set may include an "undefined" glyph that is used to resolve characters that do not match any other glyph of the universal character set.

For each descriptor item, font substitution component 200 may independently evaluate each character of the descriptor item's text string for font substitution. In some cases, the font substitution component may evaluate each character of a text string in an iterative or sequential manner. In other cases, the font substitution component may evaluate each character of a text string in a parallel manner. Such evaluation may include, as described above, determining whether the preferred font (e.g., as indicated by font 130) for a particular character is available on computer system 250. If the preferred font is available, the font substitution component may resolve the particular character with the respective glyph of the preferred font. In some embodiments, the font substitution component may, for the particular character, determine the respective glyph by matching character codes to glyph indices. To determine if a character code matches a glyph index, the font substitution component may in some cases search an encoding table that maps character codes to glyph indices. In one embodiment, such encoding table may be a 'cmap' encoding table.

If the preferred font is not available for the particular character, font substitution component 200 may search for a matching glyph from safe fonts 260. In some cases, font substitution component may sequentially or iteratively search through each safe font for a glyph that matches the particular character. In other cases, the font substitution component may search each font of the safe fonts in a simultaneous and/or parallel manner. If the font substitution component finds a matching glyph within a font of safe fonts 260, the font substitution component may resolve the particular character with the matching glyph. In some cases, if a matching glyph cannot be found within safe fonts 260, the font substitution component may resolve the character using an "undefined" glyph that graphically indicates no glyph could be found for the particular character.

Once each character of a text string has been resolved by the font substitution component, the font substitution component may generate a resolved text string that includes the characters of text string 120 represented by the glyphs determined from safe fonts 260 as described above. The font substitution component may scale the resolved text string according to the metrics indicated by the respective descriptor item (e.g., metrics 110). In some case, the metrics of the descriptor item may include metrics for the entire string, such as dimensions and/or the position of a bounding box for the entire string. In this case, the font substitution component may scale the entire string according to the metrics and generate a graphical representation of the scaled resultant text string. In other cases, the metrics of the descriptor item may include character specific metrics (e.g., separate metrics for each character). For example, the metrics of the descriptor item may include dimensions and/or the position of a bounding box for each individual character of the text string. In this case, the font substitution component may scale each glyph of the resolved text string according to the respective metrics for each character and generate a graphical representation of the scaled, resolved text string.

Figure 3A:
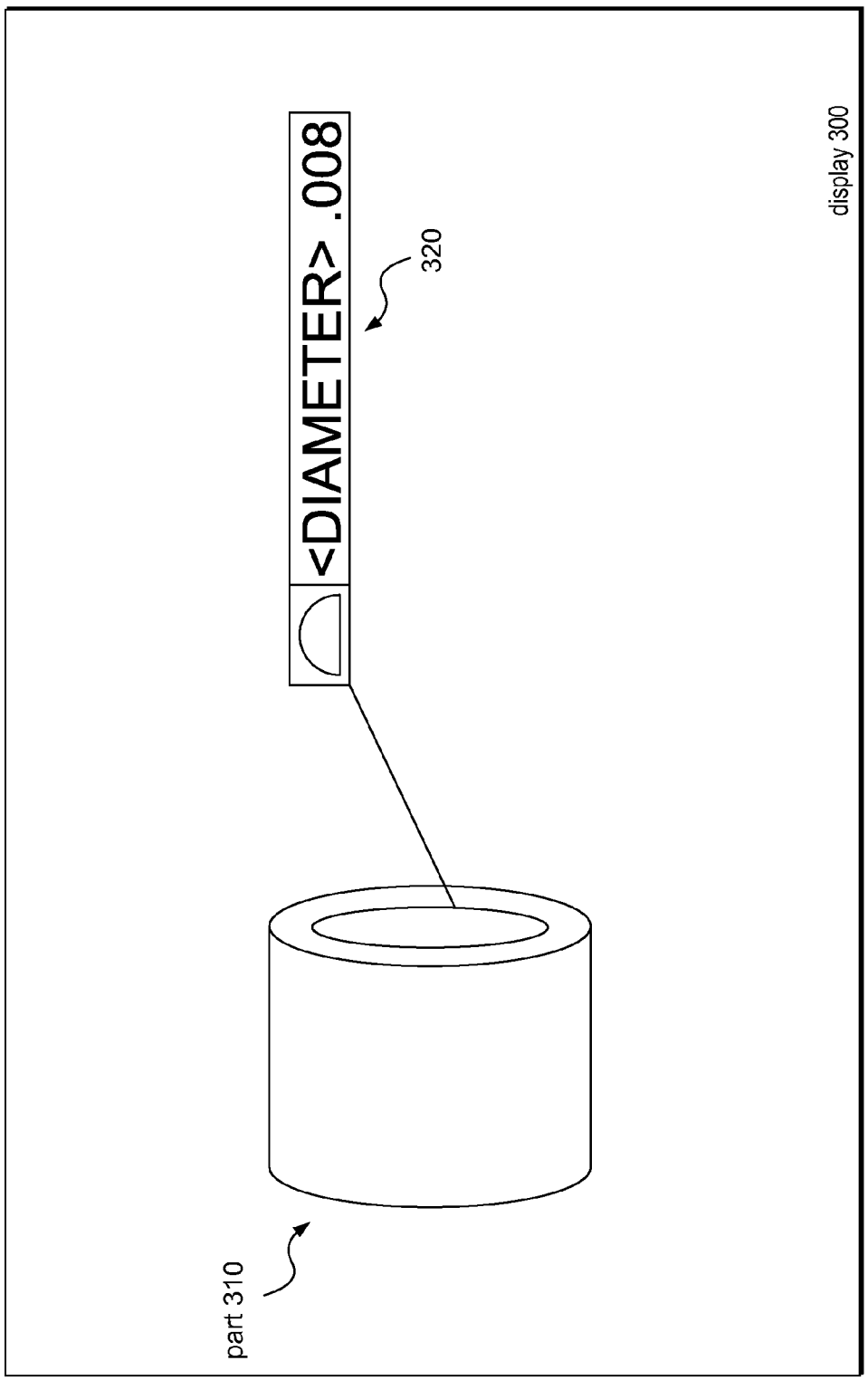
FIG. 3A illustrates an example of a display that includes a text string generated by a font substitution component, according to one embodiment.

One example of a graphical representation of a scaled, resolved text string is illustrated by display 300 of FIG. 3. In this example, display 300 may be a display of a computer aided drafting (CAD) or similar application. Display 300 may include a text string, such as text string 320. Text string 320 may be generated by a font substitution component, such as font substitution component 200 described above. For instance, in one embodiment, descriptor item 100 may correspond to text item 320. In such an embodiment, the text string of the descriptor item may be "<DIAMETER>0.008" and the metrics may include a bounding box (illustrated in FIG. 4) that defines the maximum dimensions for the string and/or specific characters of the string. In some cases, the metrics may also include position information, such as coordinates, that specify the position of text string 320 within display 300. In some cases, the font(s) used to generate the text string may be the preferred font as indicated by the text strings respective descriptor item. In other cases, the font(s) used to generate text string 320 may be fonts from a set of safe fonts (e.g., safe fonts 260). The particular safe fonts employed may be determined by the font substitution component, as described above. In some cases, the particular safe fonts used to render text string 320 may be determined though the font substitution method of FIG. 5, which is described in more detail below. Additionally, in one embodiment, text string 320 may represent product manufacturing information (PMI). Computer-aided design (CAD) applications may utilize PMI to convey information about the design of manufacturing components. Such information may include geometric dimensions, tolerance figures, three dimensional text annotations, surface finish, and other material specifications.

Figure 3B:
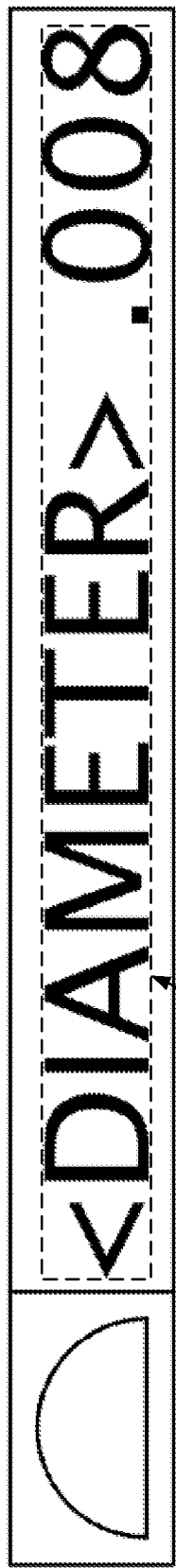
FIG. 3B illustrates an example of a text string and a string bounding box, according to one embodiment.
Figure 3C:
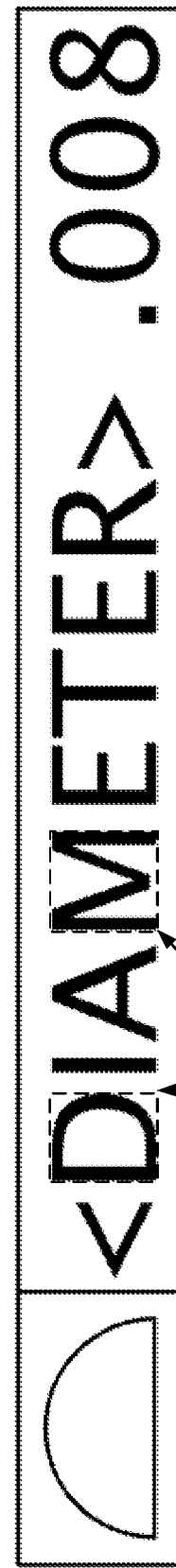
FIG. 3C illustrates an example of a text string and character-specific bounding boxes, according to one embodiment.

As illustrated by FIG. 3B, the descriptor item for text string 320 may in some embodiments specify dimensions and/or position of a bounding box for the entire string, as illustrated by string bounding box 330. In this way, irrespective of which font the font substitution component selects to represent a text string, the size of the string may be scaled (e.g., horizontal and/or vertical scaling) to occupy the same amount of space and/or the same position within a display as specified by the descriptor item. As illustrated by FIG. 3C, the descriptor item for text string 320 may in some embodiments specify dimensions and/or position information of a bounding box for multiple characters of text string 320, as illustrated by character bounding boxes 340. Note that only two character bounding boxes are illustrated for clarity; in various embodiments, the text string's descriptor item may specify a separate bounding box for each character of the text string. In the illustrated embodiment, irrespective of which font the font substitution component selects to represent a text string, each character of the string can be scaled (e.g., horizontal and/or vertical scaling) to occupy the same amount of space and/or the same position within a display as specified by the descriptor item.

Figure 4:
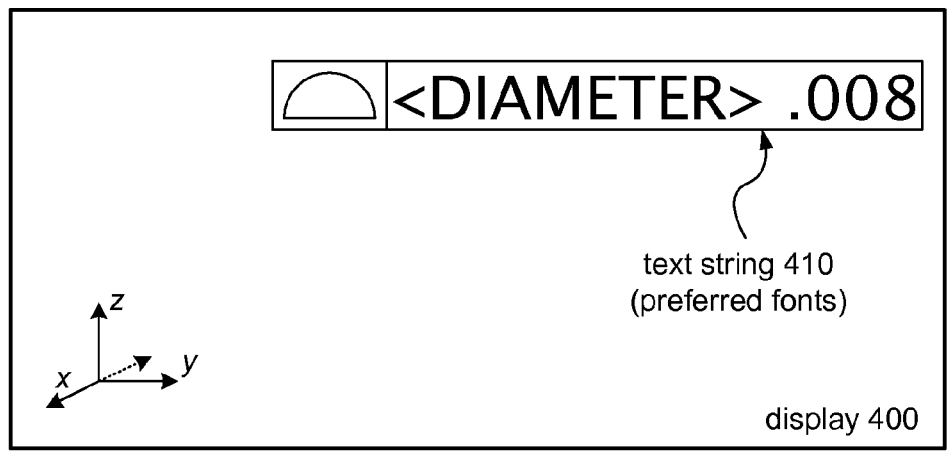
FIG. 4 illustrates examples of text strings generated from the same descriptor item on different computer systems, according to one embodiment.
Figure 4:
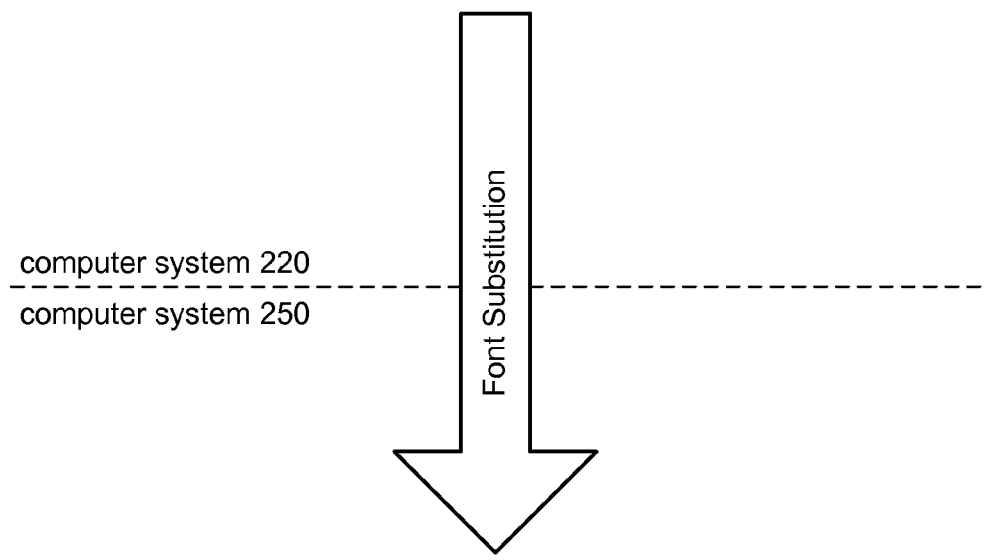
Figure 4:
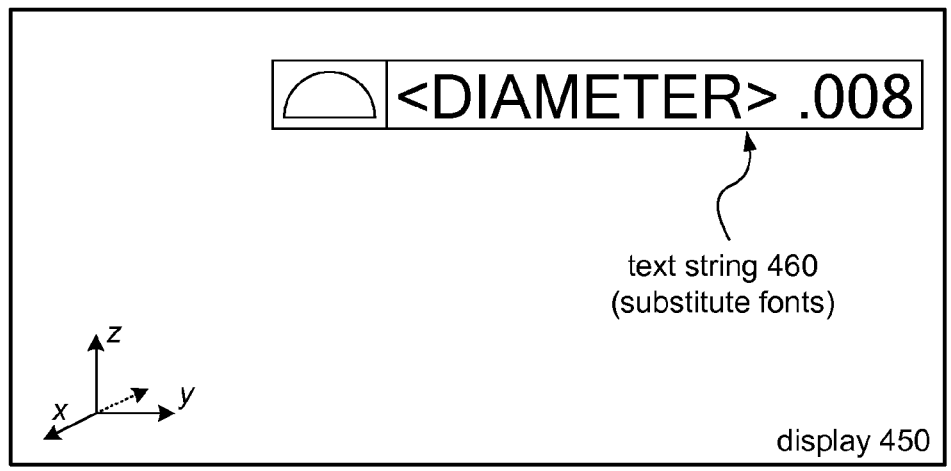

FIG. 4 illustrates an example of the generation of two text strings (based on the same descriptor item) on two different computer systems. In this example, display 400 is generated by computer system 220, which is equipped with the preferred fonts for generating the text string indicated by the descriptor item. Also in this example, display 450 is generated by computer system 250 which, in this example, is not equipped with one or more of the preferred fonts (as indicated by the descriptor item) for generating the text string indicated by the descriptor item. Note that text string 410 and text string 460 are generated from the same descriptor item. In this example, since computer system 220 is equipped with the preferred fonts indicated by the descriptor item, computer system 220 may not perform font substitution on text string 410. Computer system 220 may instead generate text string 410 according to the preferred font. Since computer system 250 may not be equipped with the preferred fonts indicated by the descriptor item, computer system 250 may utilize the aforementioned font substitution techniques as well as the font substitution method described below in regard to FIG. 5. For instance, to generate the graphical representation of text string 460, computer system 250 may, for each character, determine a matching glyph from a safe font (e.g., safe fonts 260) and resolve each character with each respective matching glyph. Additionally, if the metrics of a resolved character do not match the metrics specified by the descriptor item, computer system 250 (e.g., via font substitution component 200) may scale (e.g., horizontal or vertical scaling) the character according to the metrics specified by the descriptor item for the particular character. For instance, each character may be enlarged or reduced to fill the dimensions of a specified bounding box.

Note that while the fonts used to generate text string 410 and text string 460 are not the same in the illustrated embodiment, the size and positioning of the text strings and/or the individual characters may be equivalent in each display. For instance, the bounding boxes (not illustrated) that define the dimensions of each string, as well as the position of such bounding boxes, may be the same in display 400 and display 450. In this way, each computer system equipped with a font substitution component, such as font substitution component 200, may be able to generate a graphical representation of a text string having the same size and position irrespective of the particular fonts installed on the computer system and irrespective of the fonts actually used to render the text strings.

Figure 5:
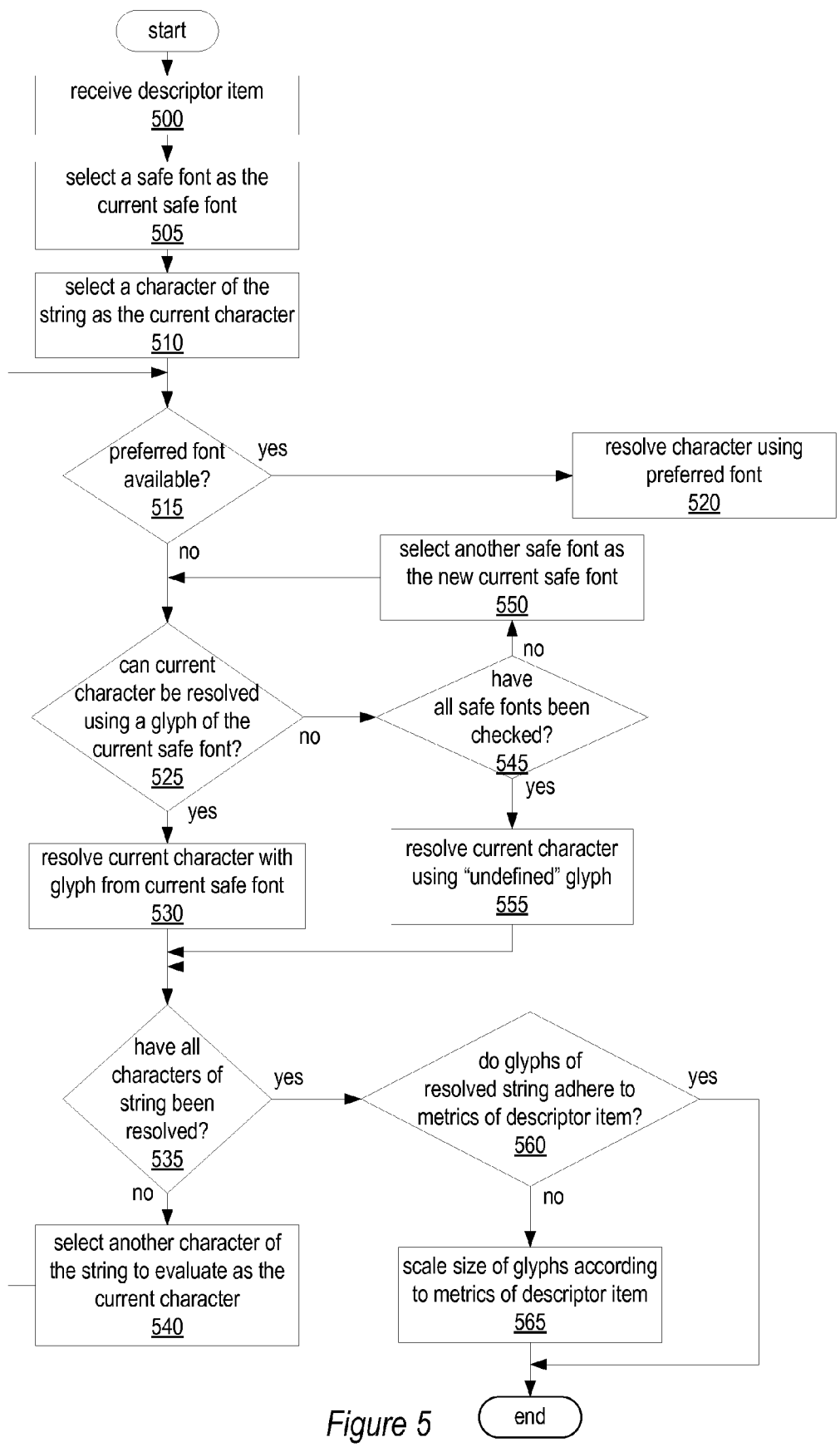
FIG. 5 is a flowchart of one example of a method for independent font substitution of string characters.

One example of a method for font substitution according to the system and method for independent font substitution of string characters is illustrated by the flowchart of FIG. 5. In various embodiments, the method described herein may be implemented by a font substitution component, such as font substitution component 200 described above. As illustrated by step 500, the method may include receiving a descriptor item. As described above, such a descriptor item may be a data object that includes information for rendering a particular text string. The descriptor item may include metrics that indicate information for rendering the particular text string. For instance, one type of metric may include a bounding box that specifies the maximum width and maximum height of a rectangle (or other shape) that completely includes the particular text string. In other cases, the metrics may be character specific. For instance, the descriptor item may specify a separate bounding box for each character of the string to be rendered. In some embodiments, such metrics may also include position related information that may specify the position of the particular text string within a display or document. Examples of such position related information include the bounding box coordinates described above in regard to FIG. 1. Descriptor items may also include data that indicate the actual text string to be rendered. For instance, an example of text strings to be rendered might include "Example" or "<DIAMETER> 0.008" as illustrated in the exemplary displays of FIGS. 3A-3C and FIG. 4. Receiving the descriptor item may also include receiving a descriptor item that indicates one or more preferred fonts with which to render the particular text string, such as preferred fonts 130. In some cases, the descriptor item may include a separate preferred font for each character of the text string indicated by the descriptor item.

As illustrated by step 505, the method may include selecting a safe font (e.g., one of safe fonts 260) as the "current safe font." As used herein, the term "current safe font" may be used to reference the particular font that is being considered at a particular moment within the steps of the illustrated method. As described above, the safe fonts may include a set of multiple fonts, the union of which may collectively span a universal character set. This universal character set may in some embodiments include the glyphs necessary to resolve each character of the text string of various descriptor items. However, in some embodiments, the universal character set may include an "undefined" glyph that is used to resolve characters that do not match any other glyph of the universal character set, such as illustrated at step 555 described below. In some embodiments, each safe font may have a priority ranking (e.g., a ranking based on font popularity or some other factor) and selecting a safe font to be the current safe font may include selecting the safe font that has the highest priority ranking and has not already been selected to be the current font. Similarly, step 510 of the method includes selecting a character of the text string indicated by the descriptor item to be the "current character." As used herein, the term "current character" may be used to reference the particular character that is being considered at a particular moment within the steps of the illustrated method. In some embodiments, selecting a character of the text string may include selecting the first character of the string. In other cases, selecting a character of the text string may include selecting other characters of the text string. Note that, in some embodiments, the selection of a safe font (e.g., step 505) and/or the selection of a current character (e.g., step 510) may be optional. For instance, in some embodiments, the order in which characters and/or safe fonts should be evaluated may be predetermined. For instance, in one embodiment, string characters may be evaluated in a standard fashion from left to right. In another example, the safe fonts may be evaluated according to their priority ranking. In some embodiments, step 505 and step 510 may be substantially similar to step 550 and step 540, respectively, as described in more detail below.

As illustrated by step 515, the method may further include determining whether the preferred font (e.g., as indicated by the descriptor item) is available for the current character. For instance, determining whether the preferred font is available for the current character may include determining whether the preferred font is installed on a computer system performing the method. In one embodiment, determining whether the preferred font is available may include determining whether one or more files associated with the font are corrupt. In some embodiments, if one or more of the preferred font files are corrupt, the method may include determining that the preferred font is not available. In some embodiments, if all of the preferred font files are not corrupt and the preferred font is installed on a local computer system (e.g., computer system 250), the method may include determining that the preferred font is available. If it is determined that the preferred font is available for the current character (e.g., the particular preferred font is installed on a computer system performing the method), the method may include resolving the current character using the preferred font, as illustrated by step 520. At this point, the method may proceed to step 535, which is described in more detail below.

In some embodiments, step 515 may include determining whether forced font substitution has been specified by a user. For instance, in some embodiments, a user may specify that all characters should be resolved using a specified font. In one example, the user may specify this option in a computer application configured to interpret and/or display descriptor items. If a user has specified that font substitution should be forced to a particular font, the method may include resolving one or more characters of the text string with the user specified font (not illustrated). The method may then proceed to step 535 described in more detail below. In some cases, if the user has specified that font substitution should be forced to a particular font, the method may include resolving all characters of the text string with the specified font and the method may proceed directly to step 560 described in more detail below. In some cases, if the user has specified that font substitution should be forced to a particular font, the method may include resolving all characters of the text string with the specified font and the method may subsequently terminate.

If at step 515 it is determined that the preferred font is not available for the current character (e.g., the preferred font is not installed on a computer system implementing the method), the method may include determining whether the current character may be resolved using a glyph from the current safe font, as illustrated by step 525. In some embodiments, determining whether the current character may be resolved using a glyph from the current safe font may include determining whether the character code of the character matches a glyph index of the font. In some cases, glyph indices and character codes may be mapped in an encoding table (e.g., a 'cmap' encoding table). In these cases, determining whether the current character may be resolved using a glyph from the current safe font may include determining whether the character code of the character maps to an index of a glyph of the current safe font according to the encoding table. If a mapping is found, the method may in some cases include determining that the character may be resolved with the glyph that has an index to which the character code maps according to the encoding table. In one embodiment, determining whether the current character can be resolved using a glyph of the current safe font may include determining whether one or more files associated with the safe font are corrupt. In some embodiments, if one or more of the safe font files are corrupt, the method may include determining that the current character cannot be resolved using a glyph from the current safe font. If it is determined that the current character may be resolved with a glyph from the current safe font, the method may include resolving the current character with the glyph from the current safe font, as illustrated by step 530. The method may then proceed to step 535, which is described in more detail below.

In some cases, at step 525, it may be determined that the current character cannot be resolved with a glyph from the current safe font. For instance, when an encoding table is employed, the method may include determining that the character code of the current character does not map to a glyph index for the current safe font. If it is determined that the current character cannot be resolved with a glyph from the current safe font, the method may include determining whether all the safe fonts have been checked for a glyph to resolve the current character, as illustrated by step 545. If one or more safe fonts have not been checked for a glyph to resolve the current character, the method may include selecting another safe font as the current safe font and repeating step 525 for the new current safe font. As demonstrated by the illustrated embodiment, this process may repeat until a glyph is found that may resolve the current character. If after checking all of the safe fonts a glyph is not found to resolve the current character, the method may include resolving the current character using an "undefined" glyph, as illustrated by step 555. One example of an undefined glyph may be a graphical representation of a square that includes an "X" or another symbol to indicate that no other glyph could be found for the current character.

Note that for a single text string, multiple characters of the text string may be resolved with glyphs from different fonts. For instance, in one embodiment, one character of the text string may be resolved with a glyph of a particular safe font whereas another character of the string may be resolved with a glyph of another safe font. In another example, one of the characters may be resolved with a glyph from the preferred font. In yet another example, one character of the text string may be resolved with said "undefined" glyph whereas other characters of the text string may be resolved with glyphs from a safe font or the preferred font. In this way, font substitution performed on one character may in some cases be independent of font substitution performed on another character of the same text string.

Subsequent to resolving the current character (e.g., determining a glyph to represent the current character) (e.g., steps 520, 530 and/or 555), the method may include determining whether all characters of the string have been resolved, as illustrated by step 535. If there are more characters of the text string to resolve, the method may include selecting another character of the text string to evaluate as the current character, as illustrated by step 540. In some embodiments, selecting another character of the text string to evaluate as the current character may include selecting the next character of the string. In other cases, selecting another character of the text string to evaluate as the current character may include selecting a character other than the next character. After the new current character has been selected, the method may proceed to step 515 and one or more of the aforementioned steps may be repeated for the new current character.

Once each character of the text string has been resolved (thus forming a "resolved" text string), the method may include determining whether the glyphs of the resolved text string adhere to the metrics of the descriptor item, as illustrated by step 560. In some cases, the metrics of the descriptor item may be metrics for the entire text string (e.g., bounding box dimensions and/or position information for the entire text string). In other cases, the metrics of the descriptor item may include separate metrics for each character of the text string (e.g., separate bounding box dimensions and/or position information for each character). In either case (e.g., metrics on a text string basis or character-by-character basis), the method may include determining whether the glyphs of the resolved text string adhere to the metrics of the descriptor item. If the glyphs of the text string adhere to the metrics of the descriptor item, no scaling other modification may be necessary and the method may conclude. If one or more glyphs of the text string do not adhere to the metrics of the descriptor item (e.g., one or more glyphs exceed the boundaries of their respective bounding boxes), the method may include scaling the size of the glyphs (e.g., horizontal and/or vertical scaling) according to the metrics specified by the descriptor item, as illustrated by step 565.

In one embodiment, the metrics may include a metric for the entire text string and scaling the glyphs may include scaling the resolved text string as a whole. For instance, in one embodiment, the metric for the entire text string may include dimensions of a bounding box for the entire text string. Accordingly, scaling the glyphs may include scaling the entire text string to fill the bounding box. In another embodiment, the metrics may include character specific metrics (e.g., one or more metrics may be associated with each character). In this case, scaling the glyphs may include individually scaling each glyph according to the respective metric. For example, in one embodiment, the metrics may specify dimensions of individual bounding boxes for each character of the text string. Accordingly, the method may include scaling each glyph of the resolved text string to fill its respective bounding box.

In some embodiments, the metrics may also specify position related information (e.g., coordinates within a display) for the entire text string and/or for each character of the text string. Accordingly, the method may include positioning within a display the text string and/or the individual characters of the text string according to the position related information specified by the metrics. For instance, in one embodiment, the metrics may specify display coordinates (e.g., x-y position) for a particular bounding box, and the method may include positioning the bounding box within a display according to the display coordinates.

In various embodiments, the method described above may be performed for a plurality of text strings. For instance, in one embodiment, a document may include multiple descriptor items and various embodiments may include repeating the above-described method for each descriptor item. In some embodiments, multiple instances of the method may be performed in a sequential manner for each descriptor item. In other embodiments, multiple instances of the method may be performed independently and in parallel for each descriptor item.

Various embodiments of a system and method for independent font substitution of string characters, as described herein, may be executed on one or more computer systems, which may interact with various other devices. One such computer system is computer system 600 illustrated by FIG. 6. Computer system 600 may be capable of implementing a font substitution component, such as font substitution component 200 described above. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions implementing a font substitution component, such as font substitution component 200 described above, are shown stored within system memory 620 as font substitution component 625. Additionally, safe fonts, such as safe fonts 260, are shown stored within system memory as safe fonts 634. In other embodiments, program instructions and/or data may be received, sent or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 640.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems (e.g., computer system 220), or between nodes of computer system 600. In various embodiments, network interface 640 may support communication via wired or wireless general data networks (e.g., network 690), such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
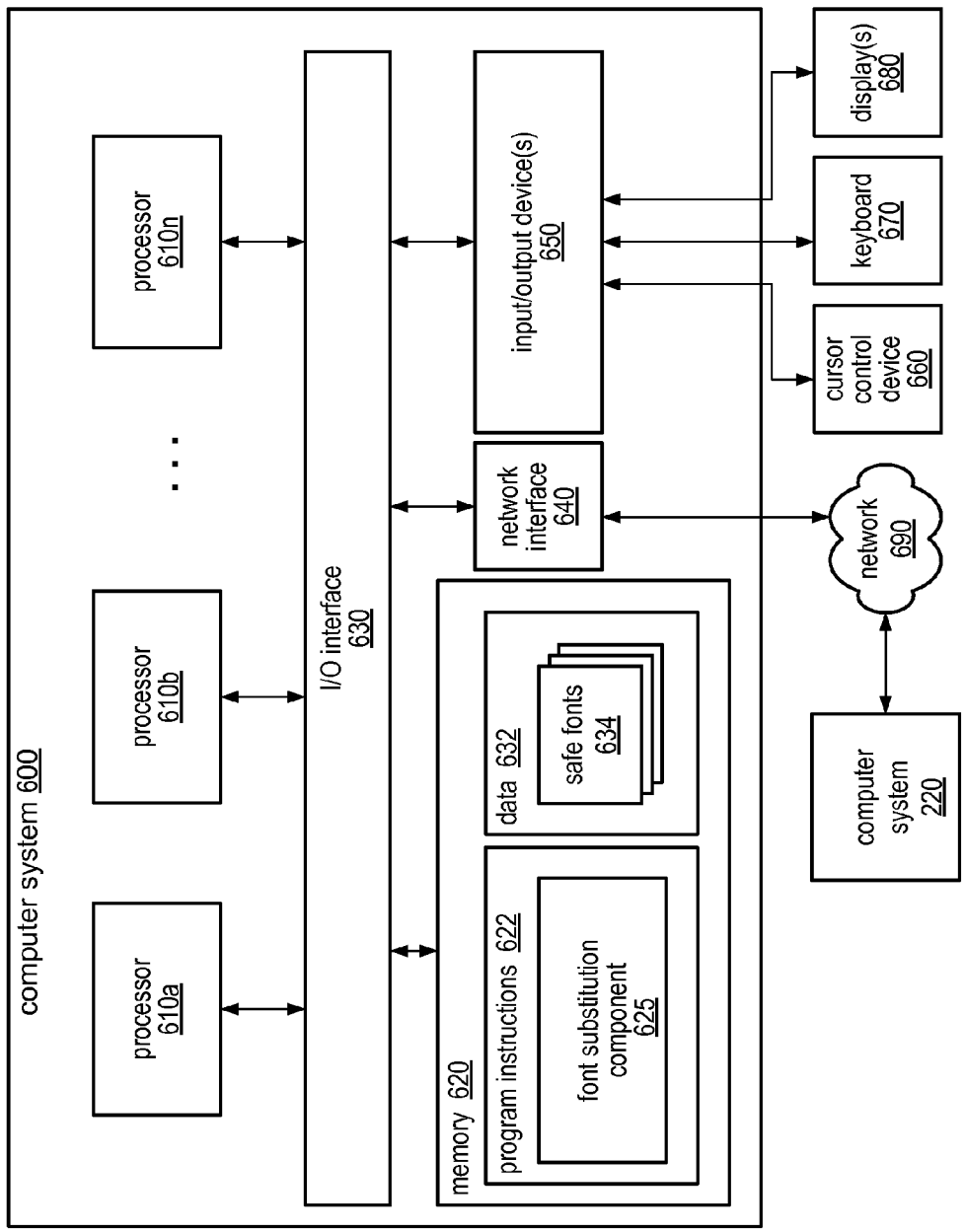
FIG. 6 illustrates a computing system suitable for implementing elements of a system and method for independent font substitution of string characters, according to one embodiment.

As shown in FIG. 6, memory 620 may include program instructions 622 configured to implement a font substitution component, such as font substitution component 200. In one embodiment, font substitution component 625 may implement the methods described above, such as the method illustrated by FIG. 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, various embodiments may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the steps of the methods may be changed, and various elements may be added, reordered, combined, omitted, modified, etc. Various modifications and changes may be made as would be obvious to a person skilled in the art having the benefit of this disclosure.

The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A computer-implemented method, comprising:
   receiving an item, wherein the item indicates a text string comprising a plurality of characters, and a respective preferred font for each character of said plurality of characters;
   performing a character-by-character font substitution analysis on each character of said text string, wherein performing said analysis comprises:
      in response to determining that the preferred font is not available for a particular character, resolving the particular character with a particular glyph from a font of a set of multiple safe fonts, wherein said particular glyph matches said particular character, and wherein said set of safe fonts collectively spans a character set;
      in response to determining that the preferred font is not available for an other character of the same text string, resolving the other character with an other glyph from a different font of said set of safe fonts, wherein said other glyph matches said other character; and
   generating a resolved text string comprising said particular glyph and said other glyph.

2. The method of claim 1, wherein said item indicates dimensions of a bounding box for the text string, wherein the method comprises scaling the size of the resolved text string according to the dimensions of the bounding box.

3. The method of claim 1, wherein said item indicates dimensions of a respective bounding box for each of said plurality of characters, wherein the method further comprises scaling the size of each glyph of the resolved text string according to the dimensions of each respective bounding box.

4. The method of claim 1, wherein said resolving the particular character with the particular glyph comprises determining that the particular glyph matches the particular character.

5. The method of claim 4, wherein said determining that the particular glyph matches the particular character comprises determining that a character code of said particular character is mapped to an index of said particular glyph as specified by an encoding table that maps character codes to glyph indices.

6. The method of claim 4, wherein each font of said set of safe fonts is associated with a priority ranking, wherein determining that the particular glyph matches the particular character comprises:
   searching a particular font of said set of safe fonts for a glyph that matches the particular character, and:
   subsequent to said searching a particular font, searching through an other font of said set of safe fonts, wherein said other font is associated with a priority ranking less than a priority ranking associated with said particular font.

7. The method of claim 1, wherein said text string indicates product manufacturing information (PMI) for one or more components.

8. A computer-implemented method, comprising:
   performing by one or more computers:
      receiving an item, wherein the item indicates a text string comprising a plurality of characters, one or more preferred fonts for rendering the text string, and one or more metrics each specifying dimensions of a bounding box;

in response to determining that a preferred font of said one or more preferred fonts is not available, resolving one or more particular characters of said text string with a respective glyph from a set of safe fonts, wherein each respective glyph matches one of said one or more particular characters, wherein said set of safe fonts collectively spans a character set;

generating a resolved text string comprising each respective glyph; and scaling the resolved text string according to dimensions of a bounding box specified by one or more of said metrics.

9. The method of claim 8, wherein said one or more metrics specify dimensions of a bounding box for each character of said plurality of characters, wherein scaling the resolved text string comprises independently scaling each glyph of the resolved text string according to respective dimensions of a bounding box specified by said one or more metrics.

10. The method of claim 8, wherein resolving one or more particular characters of said text string with a respective glyph comprises determining that a character of said text string matches a glyph of said set of safe fonts.

11. The method of claim 10, wherein determining that a character of said text string matches a glyph of said set of safe fonts comprises determining that a character code of a character of said text string is mapped to an index of a glyph of said set of safe fonts as specified by an encoding table that maps character codes to glyph indices.

12. The method of claim 10, wherein each font of said set of safe fonts is associated with a priority ranking, wherein determining that a character of said text string matches a glyph of said set of safe fonts comprises:

searching a particular font of said set of safe fonts for a glyph that matches the particular character; and subsequent to said searching a particular font, searching through an other font of said set of safe fonts, wherein said other font is associated with a priority ranking less than a priority ranking associated with said particular font.

13. The method of claim 1, wherein said text string indicates product manufacturing information (PMI) for one or more components.

14. A system, comprising:

a processor; and a memory coupled to the processor, wherein the memory comprises program instructions executable by the processor to:

receive an item, wherein the item indicates a text string comprising a plurality of characters, and a respective preferred font for each character of said plurality of characters;

perform a character-by-character font substitution analysis on each character of said text string, wherein performing said analysis comprises:

in response to determining that the preferred font is not available for a particular character, resolve the particular character with a particular glyph from a font of a set of multiple safe fonts, wherein said particular glyph matches said particular character, and wherein said set of safe fonts collectively spans a character set;

in response to determining that the preferred font is not available for an other character of the same text string, resolve the other character with an other glyph from a different font of said set of safe fonts, wherein said other glyph matches said other character; and generate a resolved text string comprising said particular glyph and said other glyph.

15. The system of claim 14, wherein said item indicates dimensions of a bounding box for the text string, wherein the program instructions are executable to scale the size of the resolved text string according to the dimensions of the bounding box.

16. The system of claim 14, wherein said item indicates dimensions of a respective bounding box for each of said plurality of characters, wherein the program instructions are executable to scale the size of each glyph of the resolved text string according to the dimensions of each respective bounding box.

17. The system of claim 14, wherein to resolve the particular character with the particular glyph the program instructions are executable to determine that the particular glyph matches the particular character.

18. The system of claim 17, wherein to determine that the particular glyph matches the particular character the program instructions are executable to determine that a character code of said particular character is mapped to an index of said particular glyph as specified by an encoding table that maps character codes to glyph indices.

19. The system of claim 17, wherein each font of said set of safe fonts is associated with a priority ranking, wherein to determine that the particular glyph matches the particular character the program instructions are executable to:

search a particular font of said set of safe fonts for a glyph that matches the particular character, and:

subsequent to said searching a particular font, search through an other font of said set of safe fonts, wherein said other font is associated with a priority ranking less than a priority ranking associated with said particular font.

20. A non-transitory computer-readable storage medium, comprising program instructions computer-executable to:

receive an item, wherein the item indicates a text string comprising a plurality of characters, and a respective preferred font for each character of said plurality of characters;

perform a character-by-character font substitution analysis on each character of said text string, wherein performing said analysis comprises:

in response to determining that the preferred font is not available for a particular character, resolve the particular character with a particular glyph from a font of a set of multiple safe fonts, wherein said particular glyph matches said particular character, and wherein said set of safe fonts collectively spans a character set;

in response to determining that the preferred font is not available for an other character of the same text string, resolve the other character with an other glyph from a different font of said set of safe fonts, wherein said other glyph matches said other character; and generate a resolved text string comprising said particular glyph and said other glyph.

21. The medium of claim 20, wherein said item indicates dimensions of a bounding box for the text string, wherein the program instructions are executable to scale the size of the resolved text string according to the dimensions of the bounding box.

22. The medium of claim 20, wherein said item indicates dimensions of a respective bounding box for each of said plurality of characters, wherein the program instructions are executable to scale the size of each glyph of the resolved text string according to the dimensions of each respective bounding box.

23. The medium of claim 20, wherein to resolve the particular character with the particular glyph the program instructions are executable to determine that the particular glyph matches the particular character.

24. The medium of claim 23, wherein to determine that the particular glyph matches the particular character the program instructions are executable to determine that a character code of said particular character is mapped to an index of said particular glyph as specified by an encoding table that maps character codes to glyph indices.

25. The medium of claim 23, wherein each font of said set of safe fonts is associated with a priority ranking, wherein to determine that the particular glyph matches the particular character the program instructions are executable to:
- search a particular font of said set of safe fonts for a glyph that matches the particular character, and:
- subsequent to said searching a particular font, search through an other font of said set of safe fonts, wherein said other font is associated with a priority ranking less than a priority ranking associated with said particular font.

\* \* \* \* \*